US012703002B2

(12) United States Patent
Cacciatore et al.

(10) Patent No.: US 12,703,002 B2
(45) Date of Patent: Aug. 11, 2026

(54) PROCESS FOR MAKING A FIBROUS WATER SOLUBLE PRODUCT

(71) Applicant: The Procter & Gamble Company, Cincinnati, OH (US)

(72) Inventors: Justin Thomas Cacciatore, Cincinnati, OH (US); Jordan David Wellbaum, Union, KY (US); Alexander Michael Fry, Liberty Township, OH (US); John Philip Hecht, Cincinnati, OH (US); Mark Robert Sivik, Mason, OH (US); Jeffrey Wayne Denny, Fairfield Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/526,183

(22) Filed: Dec. 1, 2023

(65) Prior Publication Data

US 2024/0181491 A1 Jun. 6, 2024

Related U.S. Application Data

(60) Provisional application No. 63/429,576, filed on Dec. 2, 2022.

(51) Int. Cl.

*B05D 1/30* (2006.01)
*B05C 11/10* (2006.01)
*B05C 19/04* (2006.01)

(52) U.S. Cl.

CPC ............ *B05D 1/30* (2013.01); *B05C 11/1034* (2013.01); *B05C 19/04* (2013.01); *B05D 2401/32* (2013.01)

(58) Field of Classification Search

CPC ........................................................ B05D 1/30
See application file for complete search history.

(56) References Cited

U.S. PATENT DOCUMENTS 3,218,776 A 11/1965 Cloud
4,060,648 A * 11/1977 Taylor-Brown ......... B05D 7/04 427/482

(Continued)

FOREIGN PATENT DOCUMENTS

EP 0432126 B1 10/1994
EP 1621167 A2 2/2006
JP 2008296951 A 12/2008

OTHER PUBLICATIONS

PCT Search Report and Written Opinion for PCT/US2023/081979 dated Mar. 5, 2024, 8 pages.

(Continued)

*Primary Examiner* — Dah-Wei D. Yuan
*Assistant Examiner* — Kristen A Dagenais
(74) *Attorney, Agent, or Firm* — James E. Oehlenschlager

(57) ABSTRACT

A method of manufacturing a fibrous water soluble product having particles, including: a) providing a first continuous water soluble fibrous substrate including a first side and moving in a first direction, b) providing a discretizing unit including one or more pockets comprising an opening; c) providing a continuous feed of first particles to at least one of the one or more pockets of the discretizing unit through the pocket opening at least partially filling the at least one of the one or more pockets, d) delivering the first particles from the pocket through the opening onto a portion of the first side of the first continuous water soluble fibrous substrate, and e) at least partially covering the first side of the first continuous water soluble fibrous substrate.

18 Claims, 8 Drawing Sheets

(56) References Cited

U.S. PATENT DOCUMENTS

| | | | | |
|---|---|---|---|---|
| 5,030,314 | A | 7/1991 | Lang | |
| 7,849,889 | B2 | 12/2010 | Smith | |
| 2004/0144064 | A1 | 7/2004 | Viltro | |
| 2006/0048880 | A1 | 3/2006 | Blessing | |
| 2015/0291300 | A1 | 10/2015 | Brandt Sanz | |
| 2015/0336691 | A1 | 11/2015 | Fowler et al. | |
| 2016/0228299 | A1 | 8/2016 | Jackels | |
| 2016/0228909 | A1* | 8/2016 | Marduel | B05C 5/0245 |
| 2016/0340068 | A1 | 11/2016 | Brandt Sanz | |
| 2017/0101204 | A1 | 4/2017 | Waterman | |
| 2019/0234023 | A1* | 8/2019 | Pratt | B32B 38/0004 |
| 2019/0283068 | A1* | 9/2019 | Frank | B05C 13/025 |
| 2020/0307139 | A1* | 10/2020 | Kitamura | B30B 11/02 |

OTHER PUBLICATIONS

All Office Actions; U.S. Appl. No. 18/521,214, filed Nov. 28, 2023.
All Office Actions; U.S. Appl. No. 18/526,192, filed Dec. 1, 2023.
Unpublished U.S. Appl. No. 18/521,214, filed Nov. 28, 2023, to Miguel Brant Sanz et al.
Unpublished U.S. Appl. No. 18/526,192, filed Dec. 1, 2023, to Justin Thomas Cacciatore et al.

* cited by examiner

PROCESS FOR MAKING A FIBROUS WATER SOLUBLE PRODUCT

FIELD OF THE INVENTION

Processes for making fibrous water soluble products utilizing a discretizing unit.

BACKGROUND OF THE INVENTION

Fibrous water soluble products are of increasing interest to consumers. The technology related to such articles continues to advance in terms of providing the desired active agents with the articles enabling the consumers to do the job that they wish to accomplish in a way in which they want to accomplish it.

In the realm of consumer goods, delivering the right active agents is just not enough to satisfy consumers. The look and feel of the product is often important to consumers' perceptions and can contribute to the desire to purchase the product.

Fibrous substrates have historically been used in consumer goods including dryer sheets, toilet goods, and wipes. Such products have tended to be floppy and drape around consumers' hands or fingers when the product is used. This can make the products difficult or unenjoyable for consumers to handle neatly. For such products that include active agents, it may be desirable to limit the contact between the consumer's hand and the active agents. Some fibrous substrates have a surface texture that some consumers find to be tactilely deficient. Further, when active agents are carried by fibrous substrates, the consumer may find it unpleasant to touch the active agent.

Fabricating multi-ply articles from fibrous substrates can be challenging since the individual plies of the articles need to be bonded to one another to form a coherent product. Bonding and cutting multi-ply articles can be difficult if the caliper of an individual article varies across the surface of the article which can readily happen where the article is loaded with particles. In addition, loading a fibrous water soluble product with particles can also create challenges in dissolution of the article.

With these limitations in mind, there is a continuing unaddressed need for processes to make fibrous water soluble unit dose articles with particles which can be economically manufactured and maintain acceptable dissolution.

SUMMARY OF THE INVENTION

Included herein is a method of manufacturing a fibrous water soluble product comprising particles, comprising: a) providing a first continuous water soluble fibrous substrate comprising a first side and moving in a first direction, b) providing a discretizing unit comprising one or more pockets comprising an opening; c) providing a continuous feed of first particles to at least one of the one or more pockets of the discretizing unit through the pocket opening at least partially filling the at least one of the one or more pockets, d) delivering the first particles from the pocket through the opening onto a portion of the first side of the first continuous water soluble fibrous substrate, and e) at least partially covering the first side of the first continuous water soluble fibrous substrate.

Also included herein is a method of manufacturing a fibrous water soluble product comprising particles, comprising: a) providing a first continuous water soluble fibrous substrate comprising a first side and moving in a first direction, b) providing a discretizing unit comprising one or more pockets comprising an opening; c) providing a continuous feed of first particles to at least one of the one or more pockets of the discretizing unit through the pocket opening, d) intermittently delivering the first particles from the pocket opening onto a portion of a first side of the first continuous water soluble fibrous substrate, e) metering the first particles to a target dose, and f) at least partially covering the first side of the first continuous water soluble fibrous substrate.

These and other iterations will be described more fully below.

DETAILED DESCRIPTION OF THE INVENTION

Figure 1:
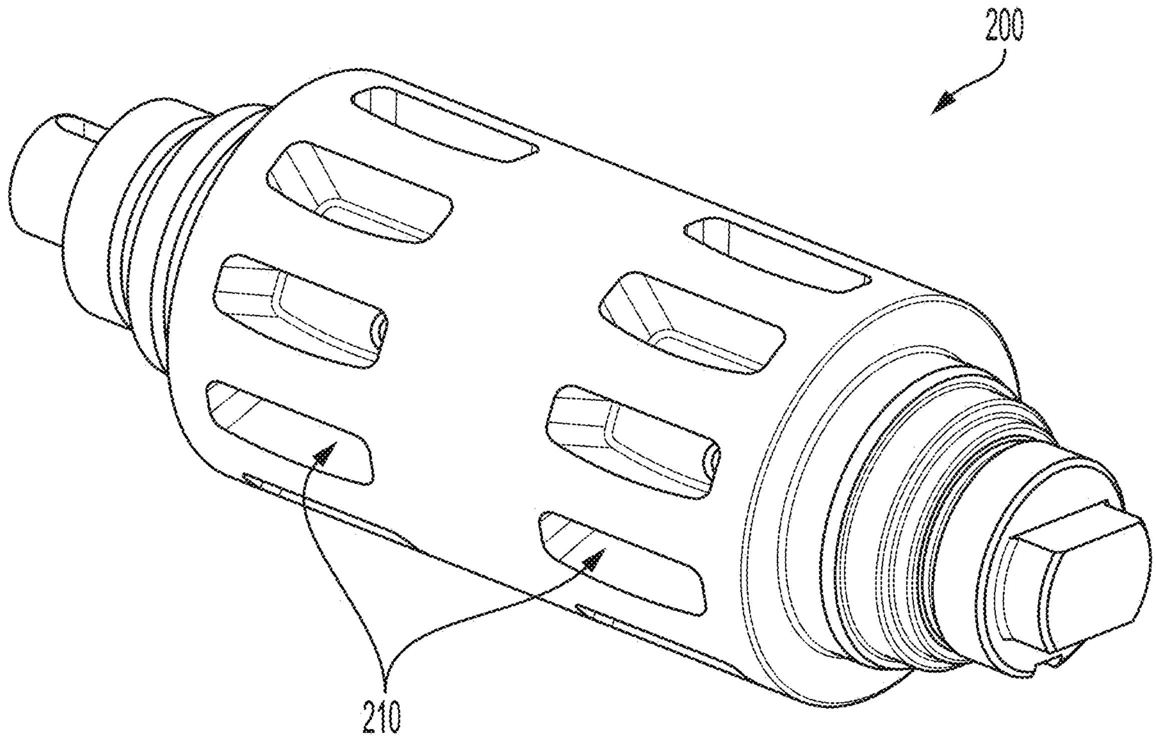
FIG. 1 is a representation of a discretizing unit with pockets.

Manufacturing a water soluble product can be a delicate balancing of materials and processing to achieve the desired end product, functionality, performance, and meet the economic requirements for mass production. Previous methods for manufacturing water soluble products with particles included the incorporation of small amounts of particles directly into the substrate by, for example, incorporating particles into the substrate during the substrate making process, or spraying the particles onto a completed substrate. These methods, however, have some disadvantages. When incorporating particles into the substrate during manufacturing of the substrate, the particles can interfere with the capture and entangling process of making the substrate. This can lead to insufficient or uncontrolled dissolution of the substrate and/or the inability to actually form a substrate. These issues greatly limit the types and properties of particles that can be added in this type of process. These particle properties which can be limiting can include particle size, particle size distribution, chemical composition, particle surface properties (like adhesion and cohesion), particle stability within the substrate making process, difficulty in segregating incompatible particles, etc. This method of addition can also add cost to the manufacturing process as it can require the solubilization of solid ingredients to add them to the substrate. Another drawback is that it is difficult to control where the particles are added to the substrate and this can create issues with sealing when particles get on the areas of the substrate to be sealed.

Despite the difficulties with known manufacturing methods, there is still a desire to be able to load larger amounts of particles, different types of particles, control where the particles are located within the water soluble product, and to do so in an economically feasible way. This allows for greater product flexibility. A review of possible solutions in the industry for unit dose applicators did not identify an intermittent particle applicator that could meet the base requirements of: frequency of dose, individual dose mass (mass flow), dosing footprint, and manufacturing flexibility within practical limits. For example, application of auger-based intermittent particle fillers are typically limited to an operational frequency of 3.33 doses/s—nearly half of the target starting rate of 6 doses/sec. Utilizing such a technology would require substantial capital investment to 'number up' units in series to attempt to hit the 6 doses/s target starting rate.

Another challenge with the addition of particles to a water soluble product is in the manufacturing of a water soluble product. For example, one way of making a water soluble product is with a continuous substrate. This continuous substrate, however, is being utilized to make discrete products. This means even though the substrate is continuous, the particles need to be applied intermittently to create the discrete products. To create the discrete products on a continuous substrate, the particles need to be delivered to the substrate in such a way that they stay predominantly in a defined area, i.e. a target area. Other devices which deliver particles, like rotary feeders, are generally designed for bulk flow control and not to create a uniform discretized dose. Without a controlled delivery of the particles, this can lead to variable amounts of particles from product to product or failure to form a discrete product due to particles being located in regions needed for scaling.

A further challenge in controlling particle delivery to a substrate is seen where the substrate is moving. This requires coordination between the delivery of the particles to the substrate and the positioning of the substrate with the delivery mechanism. For unit dose applications, intermittency of dosing is phased with the position of the yet-to-be cut substrate product position on the substrate to form discrete units. Thus, the timing of the particle dose delivery and movement of the substrate need to be coordinated to allow for formation of the discrete units.

Moreover, the movement of a substrate during and after particle application can exacerbate attempts to deliver particles to the desired portion of the substrate as particles can roll and/or splash as they land on a moving substrate or as they continue moving with the substrate to finish the manufacturing process. In addition, failure to control the footprint of particles deposited on a substrate can result in some of the particles flowing into the area used for sealing the substrate to create the water soluble product. While a small amount of particles in this area can be tolerated, too many particles in this area can interfere with the seal and can cause product failure or failure to form a product. Ideally these issues are controlled through manufacturing conditions without the need for the addition of corrective steps, like vacuuming to remove loose particles, to allow for the more cost effective and speedy production of the product.

When looking for a solution, the inventors were interested in finding something that could be utilized for intermittent particle delivery with the ability to precisely control the deposition of particles into a target region of the substrate. One possible solution was the use of a gravure like applicator; however, gravure applicators are most commonly known for gravure printing which involves liquids, not particles. In the gravure printing process, an image is recessed into the surface of a metal cylinder. These recesses are very small microcavities which accommodate ink. The ink is most often put into a basin which is contacted by the cylinder to pick up the ink, where the ink is then transferred onto a substrate by pressing the cylinder to the substrate. The dimensions of the cavities and the contact between the inked gravure cylinder and the substrate are designed such that the predominate forces that dictate mass transfer are surface tension/capillary/compressive forces. In addition, gravure printing is very dependent on ink viscosity, substrate speed, and the pressure applied between the gravure applicator and the substrate to facilitate the gravure printing process. As particles cannot be applied for the present application in the same fashion, a direct application of a gravure type applicator was not possible and the traditional gravure process needed major adaptations to be able to accomplish the desired manufacturing.

First, to accommodate the delivery of particles from a gravure like applicator, the scale is adapted. Microcavities are removed and larger pockets are included on the applicator (i.e. discretizing unit). The use of the larger pockets allows for the accommodation of both smaller and larger particles and at the levels desired for addition to a fibrous substrate. In addition, it is desired for there to be flexibility to dynamically change the amount of material dosed using a fixed pocket on a discretizing unit. Unlike a traditional gravure rotor which is almost always locked to the desired image to be printed, the use of oversized pockets on a discretizing unit allows for the use of inserts to adjust the dosing amount of the particles as desired without the need to replace the entire discretizing unit. The oversized pockets also allow for an air gap which would be undesirable in a printing application.

In addition, physical contact between the gravure applicator and the target substrate needs to be removed because contact between the discretizing unit and the substrate could damage the substrate. Without physical contact between the discretizing unit and the substrate, a different process for transfer of the particles to the substrate is needed than that used in a traditional gravure process. The primary avenue for transfer of particles from a discretizing unit and a substrate can be gravity with a proper set-up.

To facilitate the use of gravity, versus compressive forces, to deposit particles from the discretizing unit to a substrate, a stationary part, like a stator can be utilized. While a stator is unnecessary for a traditional gravure process, here a stator can help in many ways. For example, a stator can be utilized to help direct the ingress of particles into the discretizing unit and egress of particles out of the discretizing unit. In addition, the location of the stator inlet can be optimized to help minimize the amount of particles entering an annular space between a stator and a discretizing unit. Moreover, the location of the stator output can impact how the particles are deposited onto the substrate and the footprint of those particles on the substrate. The use of a stator is a large departure from a traditional gravure printing process.

As can be seen from the description above, while generally utilizing the idea of a gravure process the present inventors have made significant changes to accommodate such a system for use with particles and in a non-contact environment.

Manufacturing Process

As discussed above, a process for manufacturing a substrate with particles can have two primary elements, a discretizing unit 200 and a stator 300. A discretizing unit 200 can help take a flow of particles and transform it into discrete units of particles. An example of a discretizing unit 200 can be seen in FIG. 1. The discretizing unit 200 can then deliver these discretized particle units to a substrate. This function can be accomplished, for example, by including pockets 210 on the discretizing unit 200 for receiving particles.

The discretizing unit 200 can have one or more pockets 210. The pockets may be fixed with respect to the discretizing unit, i.e. they do not move separate from the discretizing unit. The number of pockets 210 can be optimized based on the desired and/or operable size of the discretizing unit 200. They can also be optimized based on the desired delivery of particles on a substrate. For example, pockets can be side-by-side or top-to-bottom to allow for the delivery of multiple particle loads at the same time. These particle loads may be the same particles or different. A discretizing unit can include, for example, from about 1 to about 20 pockets, from about 2 to about 20 pockets, from about 3 to about 20 pockets, from about 5 to about 18 pockets, from about 6 to about 16 pockets, from about 8 to about 16 pockets, from about 8 to about 12 pockets, or any combination thereof.

The location of pockets 210 of the discretizing unit 200 can be, for example, equidistant around the circumference of the discretizing unit. Equidistant location of pockets on a discretizing unit is preferred if operating at a fixed velocity as non-equidistant location of pockets can result in cyclic and/or non-constant motion profile for the discretizing unit which can be difficult to control and tune at high operational speeds. They can also cause issues of timing for ingress and/or egress of particles from a pocket.

The pockets 210 on the discretizing unit 200 can be sized as needed for the desired dose. This can include dimensions in the cross direction, machine direction, and depth. The cross direction aligns with the axis of rotation of the discretizing unit. For the cross direction, this can contribute to the width of the particle footprint as they are placed on the substrate. The wider the pocket in the cross direction, the wider the footprint of the particles on the substrate. The cross direction dimension can also impact particle ingress and egress from the pocket. A larger dimension in the cross direction can allow for a quicker egress of particles onto the substrate and ingress of particles into the pocket. These can be important parameters to consider when putting together a particle delivery system. The desired cross direction dimension of a pocket can be, for example, from about 1 mm to about 100 mm, from about 3 mm to about 95 mm, from about 10 mm to about 90 mm, from about 20 to about 50 mm, from about 25 mm to about 40 mm, or any combination thereof.

The machine direction is perpendicular to the cross direction. The dimension of a pocket in the machine direction can also contribute to the footprint of the particles on the substrate. The longer the machine direction dimension, the longer the potential footprint of the particle on the substrate. Thus, the machine direction dimension can be limited based on the desired particle footprint. The machine direction dimension can also impact ingress to and egress of the particles from the pocket. The desired machine direction dimension of a pocket can be, for example, from about 1 mm to about 100 mm, from about 3 mm to about 95 mm, from about 10 mm to about 90 mm, from about 20 to about 50 mm, from about 25 mm to about 40, from about 10 mm to about 15 mm, from about 8 mm to about 12 mm, or any combination thereof.

There is an additional consideration for a machine direction dimension. The machine direction dimension in combination with the stator inlet size helps dictate the exposure time of the pocket to the infeed of particles. For a given discretizing unit rotational speed, an increase in the machine direction dimension will allow a pocket 'more time to fill' with particles. So, it's a balance of a machine direction dimension that's long enough to appropriately fill with particles, and one that's small enough not to contribute to unnecessarily long dosing times.

The pocket will also have a depth. The depth can be optimized to allow for particle ingress and egress. The depth of a pocket can also be optimized to account for ingress of particle and egress of air from the pocket. A minimum depth is preferred where the particles can retreat into the pocket which minimizes sheering of particles on the stator. For example, a pocket may have a depth of about 1 to about 25 mm, preferably from about 2 to about 15 mm, or from about 3 to about 10 mm. Sheering of particles can cause hygiene issues in the system and cause malfunction over time.

The pocket can also have a shape. The shape can be any that meets the need of the desired particle delivery. For example, the pocket may be a rectangular prism, cube, cone, pyramid, a concave "v", divots, cylindrical, have a triangular cross section, a rectangular cross section, or any combination thereof. For example, a grid of dimples can be a repeating pattern on the circumference of a discretizing unit. In this pattern, a 5×5 grid, for example, could be a unit dose and take the place of a single pocket per unit dose. Where the pocket is a dimple, the number of pockets on can be much higher than discussed above, for example, on the order of 100's to 1000's of dimples. For an elongated particle, like a prill, a preferred shape can be a concave v. In addition, the interior of a pocket can be textured.

The discretizing unit 200 can also have the function of a metering device. In this configuration, the pockets 210 or a collection of pockets utilized together to make a unit dose on the discretizing unit 200 are of the precise volume of the target dose of the particles. If the discretizing unit 200 is not also metering, then the pockets 210 will likely be oversized for the target dose and a separate metering device, like a loss-in-weight feeder, can be utilized to meter the flow of particles into the pockets 210 of a discretizing unit 200. The target dose of a discretizing unit pocket may be by weight or by volume. Utilizing volume can be more accurate as the density of particles can vary from one particle to another. The target dose in weight can be, for example, from about 0.1 g to about 15 g; from about 0.2 g to about 15 g, from about 0.3 g to about 10 g, from about 0.4 g to about 8 g, from about 0.1 g to about 4.0 g. A target dose in terms of volume could be, for example, from about 0.1 $cm^3$ to about 8 $cm^3$, from about 0.1 $cm^3$ to about 7 $cm^3$, from about 0.1 $cm^3$ to about 6 $cm^3$, from about 0.1 $cm^3$ to about 5 $cm^3$, and from about 0.1 $cm^3$ to about 4.0 $cm^3$, or any combination thereof.

A discretizing unit is moveable, preferably it rotates. A discretizing unit may rotate, for example, at a speed of about 10 rpm to about 100 rpm. The discretizing unit 200 can be a rotor. A rotor can be generally described as a rotating assembly. It is generally a driven element, controlled by a motor. The rotor can be run at a desired speed. The speed may be uniform or variable. The speed contributes to the dwell time of a pocket during which the particles ingress into a pocket. When utilizing a non-uniform speed, the discretizing unit may be slowed down to allow for ingress of particles from the stator inlet and then sped up to pass through the portion of the discretizing unit without a pocket. Likewise, the discretizing unit may be sped up so as to capture less particles at the stator inlet and then slowed down to pass through the portion of the discretizing unit without a pocket. The same goes for egress from the pocket of a discretizing unit. The discretizing unit may be sped up or slowed down at the point of particle exit to accommodate the desired particle footprint on the substrate or help coordinate timing of the dose on the substrate.

The rotor can be uniform or non-uniform depending on the desired set-up. A benefit to a fairly uniform rotor is that it allows the process to be run at a set speed to hit a desired unit per minute target. It also allows for better control of the annular space between the discretizing unit and the stator. A rotor with varied pocket spacing could also be utilized with the inclusion of a motion profile for the rotational speed.

The next element for a particle delivery system can include a stator 300. An example of a stator can be seen in FIG. 2 and an exploded view of a stator 300 and discretizing unit 200 in FIG. 3. The stator 300 can include one or more particle inlets 310. The stator 300 can control the flow of particles into the pockets 210 of the discretizing unit 200. This can be done, for example, through the design of the particle inlets 310. The dimension, shape, and the location of the inlet 310 on the circumference of the stator 300 can impact filling efficacy of discretizing unit pockets 210 with particles. For example, as noted above, increasing the stator inlet opening increases the ability to fill the pockets at higher rotational speeds. For example, by changing the stator inlet opening from 6 mm length (direction of rotation) to ~17 mm, the maximum rate of dosing of a full pocket dose rose from ~2 doses/s to 8 doses/s without any other changes.

Figure 3:
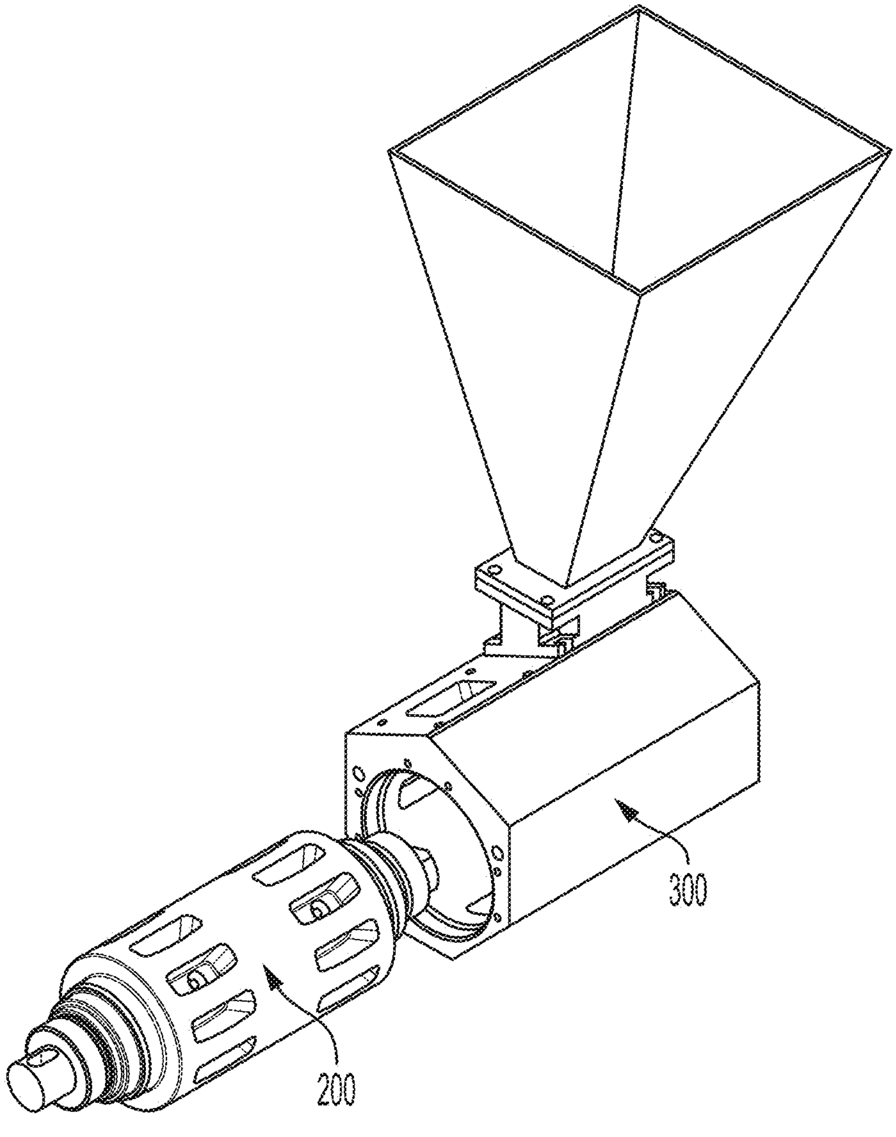
FIG. 3 is an exploded view of a discretizing unit and a stator.
Figure 4:
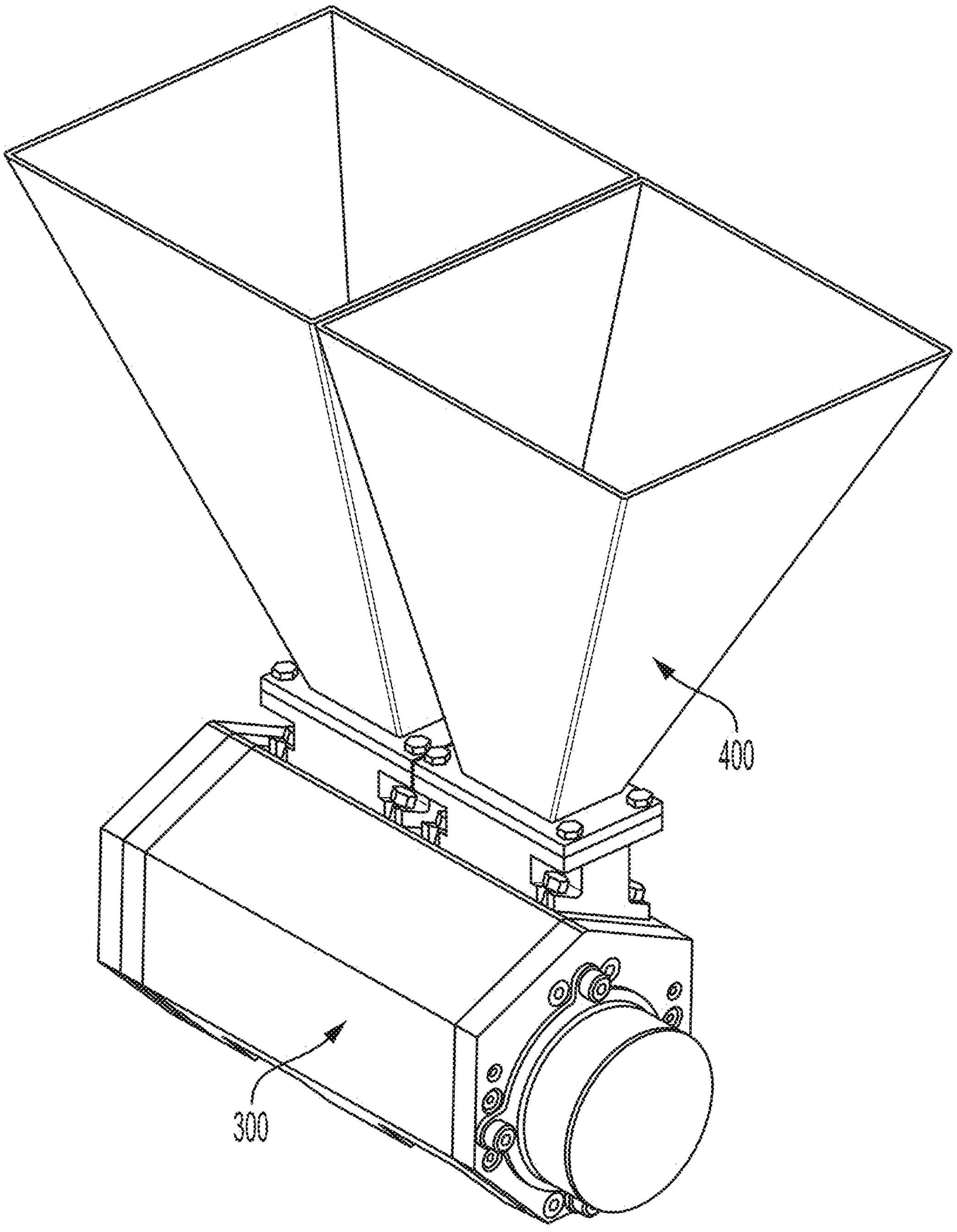
FIG. 4 is a representation of a combination of a stator and a hopper.

The stator 300 may be a housing for a discretizing unit 200 and located around a discretizing unit 200, see FIGS. 3 and 4. The location of the stator in relation to the discretizing unit also contributes to another parameter—the annular space between the discretizing unit and the stator. The specifications and tolerance of this component can ensure minimal particle transfer into this annular space that could then contribute to: particle shearing/breakage, surface fouling, and/or clogging. An additional mechanism may be added to help prevent or minimize particle ingress into the annular space, for example, a mechanical seal or blade could be utilized to prevent particles from getting into the gap between the discretizing unit and the stator.

The annular space between a discretizing unit and a stator can be adjusted as needed depending on, for example, the size of the particle being deposited on the substrate, machining constraints, cost, and assembly feasibility. The annular space may be, for example, from about 10 μm to about 125 μm, from about 20 μm to about 100 μm, from about 20 μm to about 90 μm, from about 30 μm to about 80 μm, from about 40 μm to about 80 μm, from about 50 μm to about 75 μm, or any combination thereof.

Figure 8:
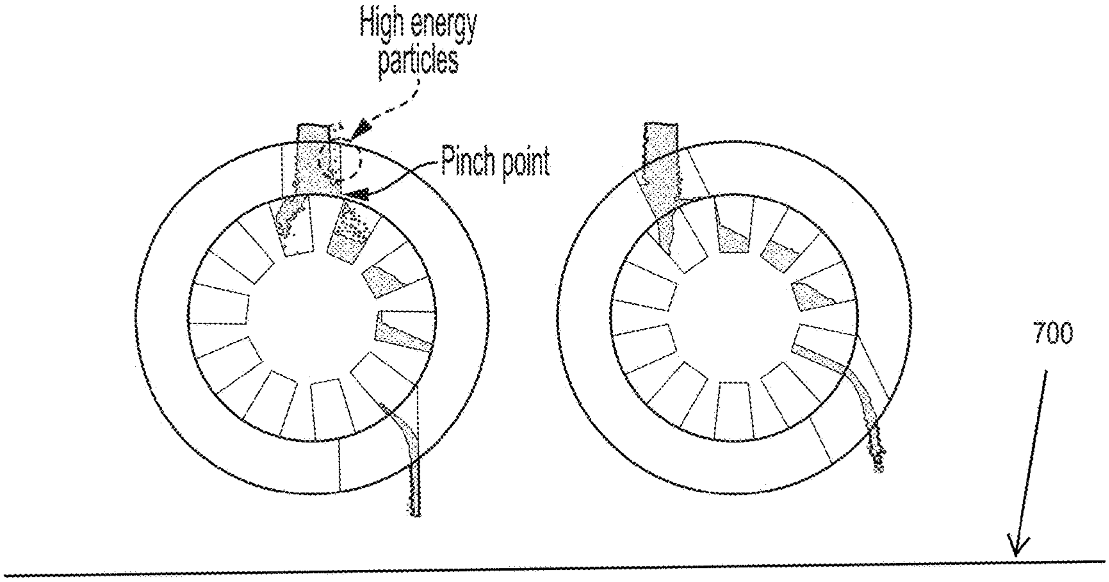
FIG. 8 is a cross-section view of a discretizing unit and a stator.

Another way to minimize particles entering the annular space is to minimize the contact between the particles and the annular space. This can be done be positioning the stator inlet so that it is delivering the particles to the discretizing unit downhill from the pinch point. The location of the pinch point is determined by the stator inlet wall and the direction of rotation of the discretizing unit. A visualization of this concept can be seen in FIG. 8 which shows a pinch point on the left representation and how moving the stator inlet to a downhill position minimizes impact of the particles with the pinch point (i.e. annular space). This minimization helps to keep particle integrity intact, which is especially important for particles which deliver a benefit upon rupture, like a perfume microcapsule. It also helps prevent the creation of fines through the shearing process which changes the particle size distribution of the particle being deposited on the substrate.

Figure 7:
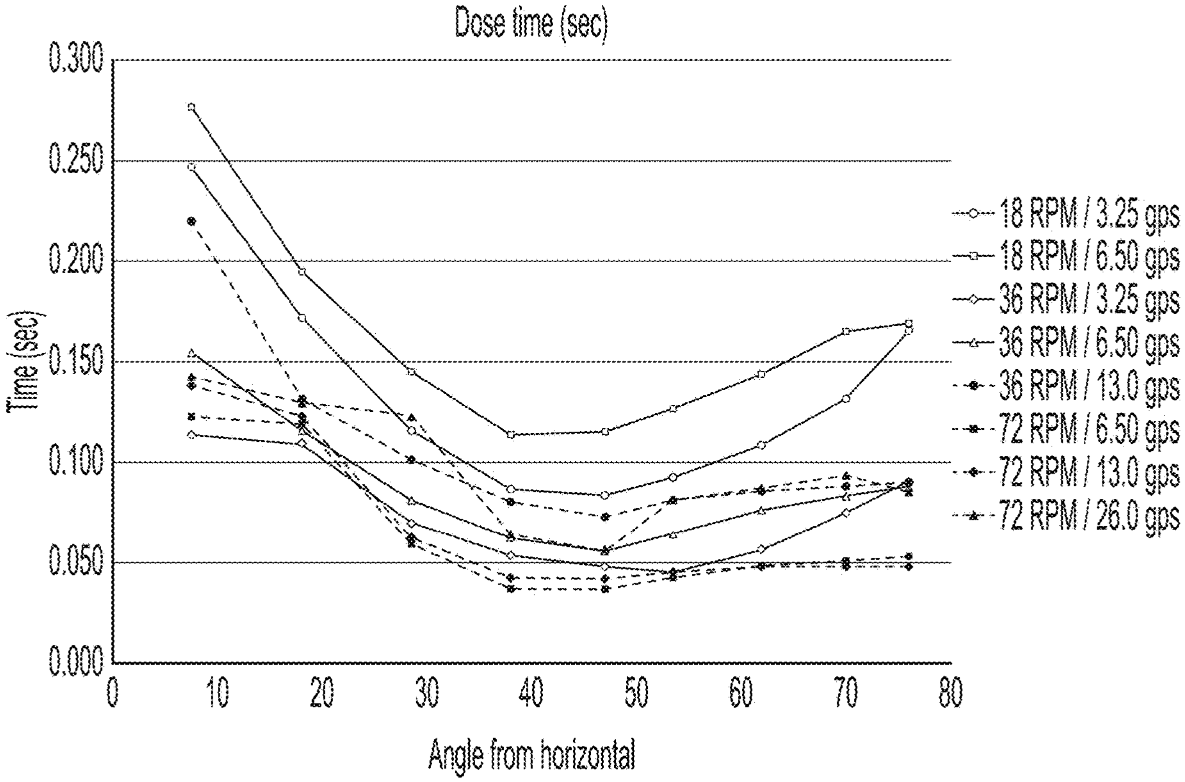
FIG. 7 is a graph showing dose time versus angle from horizontal on the stator outlet.

Additional features of a stator 300 can include the dimensions and location along the circumference of the stator of an outlet 320. The outlet design, in combination with the pocket geometry of a discretizing unit, can be primary contributors to the laydown of the particles on the substrate. For example, by slight modifications of the design of the stator outlet, the time of particle ejection from the gravure process can be dramatically increased or decreased, which, when coupled with a moving substrate will directly translate to a modification of the laydown footprint of particles onto the substrate. Specifically, a stator opening of about 45 degrees from the horizontal provides an optimum minimum egress time for most particles, as can be seen in FIG. 7. It is also beneficial to design the stator outlet in such a way as the final portion of the particles exiting the stator outlet have a trajectory that is not predominantly downward, but is in the machine direction of the substrate. The net effect is that it decreases the overall particle footprint and gives an economical advantage of being able to speed up the process and to have a better footprint on the substrate.

This discretizing unit and stator can be incorporated into a process for making a fibrous water soluble product, as described below.

Methods of Making a Fibrous Water Soluble Product with Particles

A process for making a fibrous water soluble product can first include making a fibrous water soluble substrate. The substrate may be continuous or discontinuous. A description of a process for making a water soluble fibrous substrate can be found, for example, in U.S. Pat. No. 10,683,618, which is incorporated herein by reference.

Figure 5:
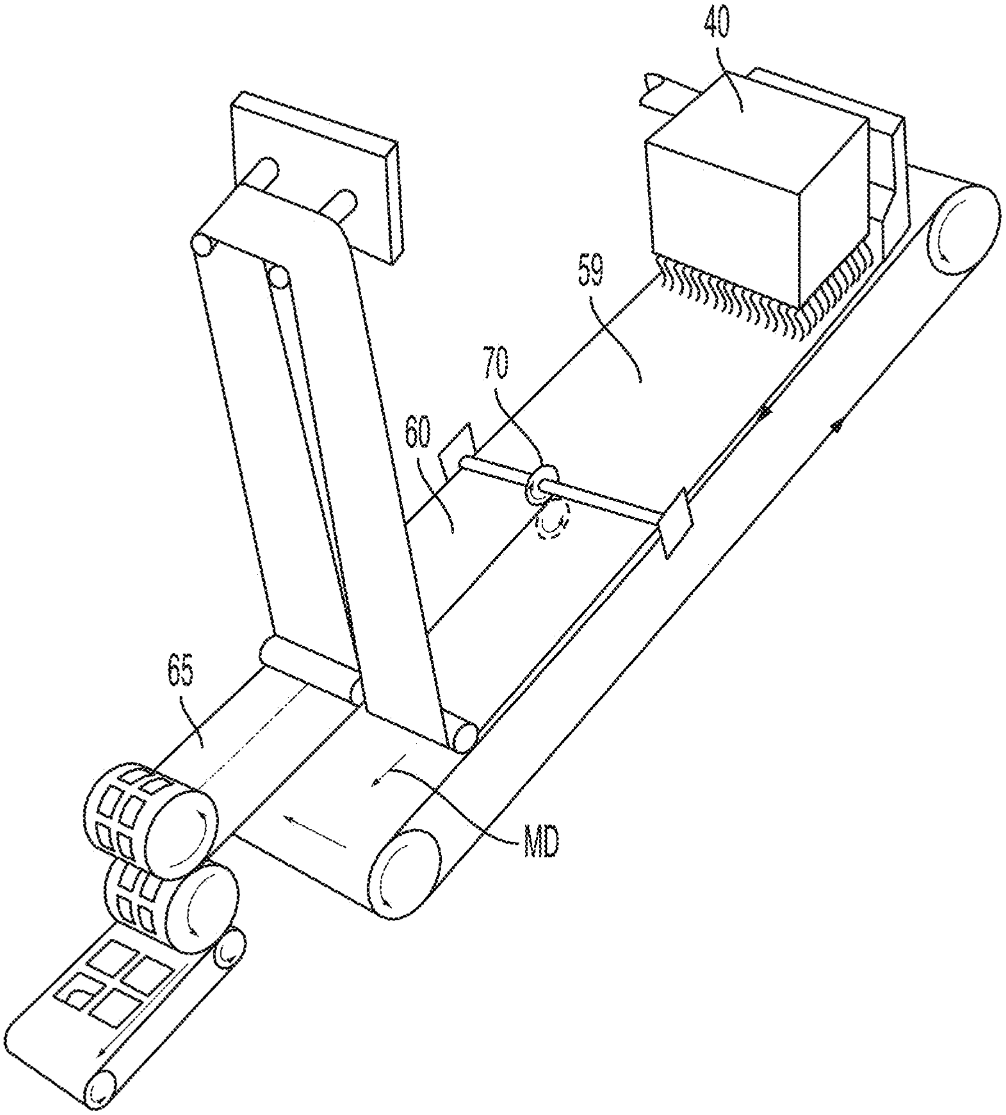
FIG. 5 is a schematic representation of a process of making a fibrous water soluble product.
Figure 6:
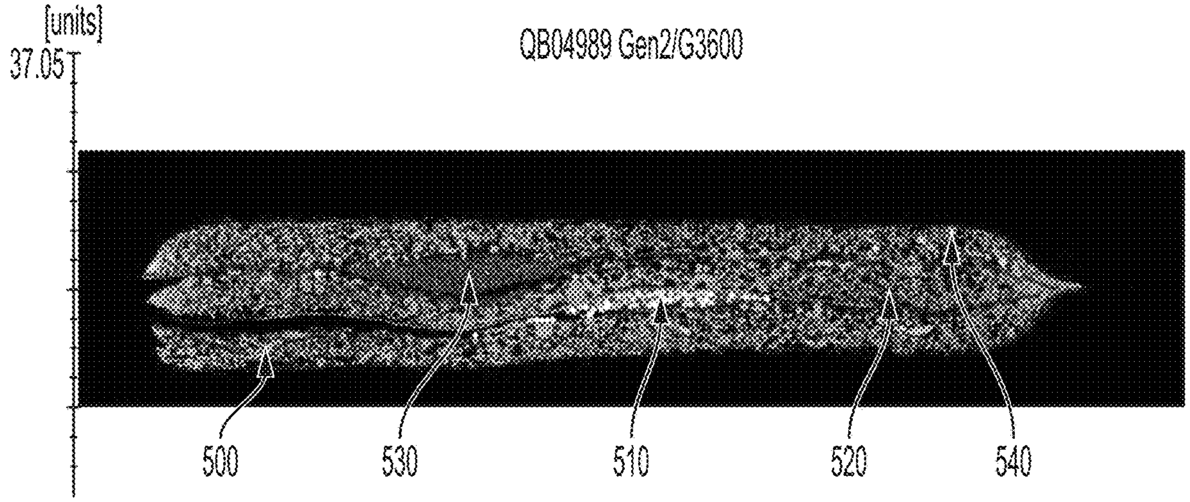
FIG. 6 is a micro CT image of a fibrous water soluble product with particles.

Once a substrate is formed, it may be provided to the process. A single substrate may be provided, multiple substrates, or even a parent substrate that is cut into multiple substrates during the manufacturing process. An example of a single substrate being formed into multiple substrates can be seen in FIG. 5. In FIG. 5, a parent continuous substrate 59 can be formed on a die block assembly 40 and then cut in the machine direction MD by a knife 70, for instance a rotary cutting knife that cuts in the machine direction MD, forming first 60 and second 65 continuous substrates. Cutting a second substrate from the parent continuous ply substrate 59 can be practical for providing better manufacturing quality control.

Whether starting with a parent substrate which is separated into two substrates, a single substrate, or multiple separate substrates, particles can be added to a substrate utilizing a discretizing unit 200 and a stator 300. Particles are supplied to a hopper 400 where they are fed into a stator 300. At least a portion of the particles pass through a stator inlet 310 into a discretizing unit pocket 210. The discretizing unit pocket 210 may be fully or partially filled with the particles. The discretizing unit pocket may be sized to meter the dose. In this execution, the discretizing unit pocket dimensions determine the volume of the dose. This dose volume can be altered by, for example, changing out the discretizing unit to one with pockets of a different size or, for example, by adding pocket inserts to adjust the volume as desired. The dose can also be metered upstream of the discretizing unit, by, for example, a metering device. In this execution, the discretizing unit pockets can be oversized and then filled to the target dose as controlled by the metering device.

A substrate can have a target area for particle application and/or laydown. A target area is that portion of the substrate where particle application is desired. The configuration of the gravure like apparatus can impact the ability of the delivered particles to be applied to and stay within a target area. The gravure like process can allow for deposition of about 75% or more, about 80% or more, about 85% or more, about 90% or more, about 95% or more, or most preferably about 97% or more of delivered particles from a pocket to remain within a target area after exiting a discretizing unit, for example a pocket opening, or until the substrate containing the particles is covered and/or sealed. Multiple pockets may deliver particles to the same target area of a substrate.

Figure 9:
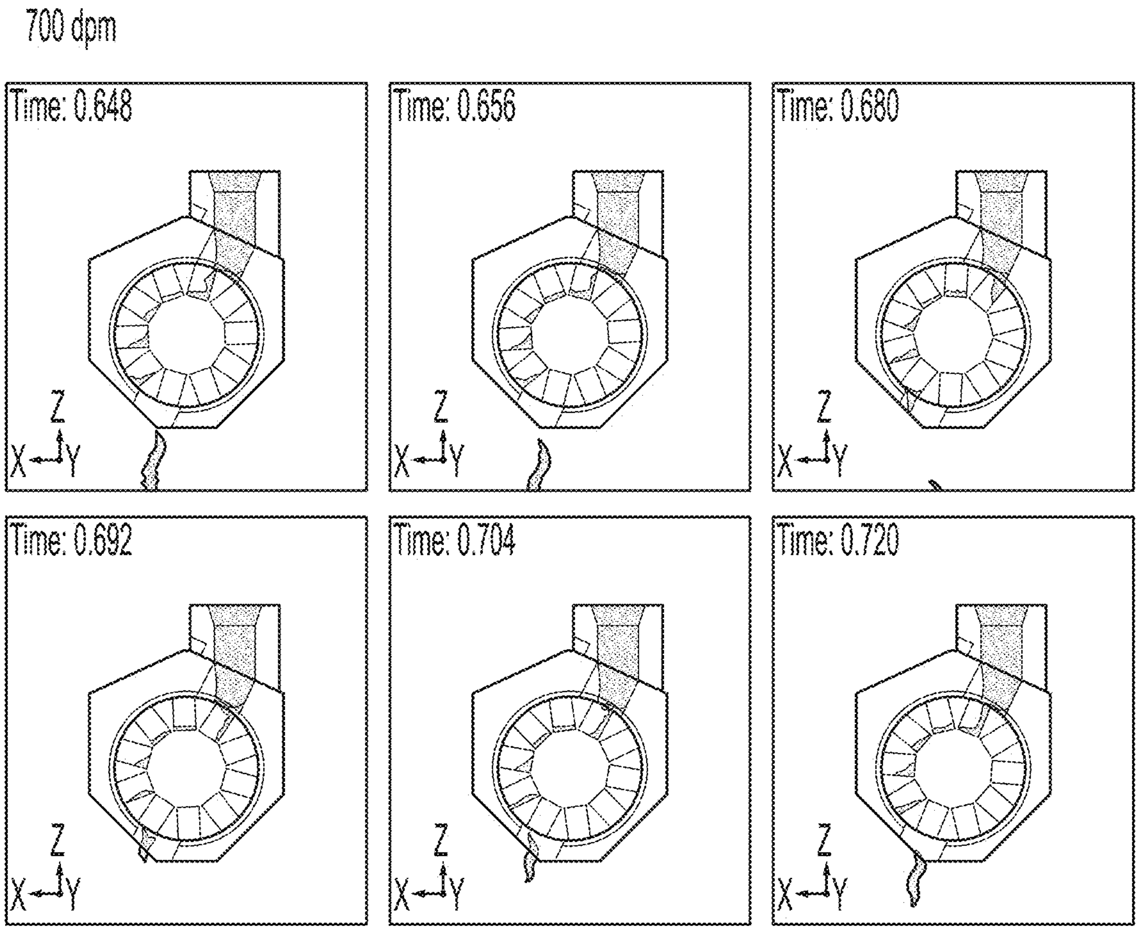
FIG. 9 is a time lapse of a cross-section view of a discretizing unit and a stator depositing particles onto a fibrous substrate.

As can be seen in FIG. 9, the discretizing unit rotates to bring the particles to a stator outlet. The discretizing unit may rotate either the same direction as the substrate (preferred) or in the opposite direction of the substrate. The particles leave the discretizing unit pocket, pass through a stator outlet, and are deposited onto the substrate. The substrate may be still or in motion during the deposition process. For example, the substrate may be moving at a rate of about 15 meters per minute or more, about 20 meters per minute or more, about 25 meters per minute or more, 30 meters per minute or more, or preferably from about 30 m/min to about 60 m/min. Gravity can help the particles leave the discretizing unit pocket and deposit on the substrate located below the discretizing unit.

The substrate may be any reasonable distance from the stator outlet. Generally this distance is minimized to reduce particle velocity and, therefore, particle bounce upon contact with the substrate. The distance from the stator outlet to the substrate should not be too close or there could be gouging of the substrate. In one instance, a target distance of about 1 cm from the stator outlet to the substrate surface is used. In addition, air flow through the substrate, a vacuum through the substrate, or an air curtain can be utilized to help contain particle splashing or movement upon contact with the substrate. Further, a substrate may be at least partially coated with a material to help particles stick to a substrate and/or to minimize particle bounce upon application to a substrate. This can include any material which would make the substrate itself sticky, like water or any material which will partially wet the particles making the particles themselves sticky. These materials could be, for example, other liquid actives, like perfume, silicone (ex. antifoam), etc. This substance could also be, for example, an adhesive. Suitable adhesives can be found in "Viscoelastic Windows of Pressure-Sensitive Adhesives", E. P. Chang, *J. Adhesion* 34 (1991) 189-200. These materials can be applied to the substrate, for example, through atomization. This can be in a pattern or random.

Once the particles are positioned on the substrate, a second portion of the substrate or a second substrate is positioned over the first substrate onto which the particles have been deposited. Once the one or more substrates are positioned as desired, they can be bonded to one another, for example, by thermal bonding. Thermal bonding can be practical if one or more of the layers contain a thermoplastic powder, optionally water soluble thermoplastic material. Thermal bonding can also be practical if the fibers constituting one or more of the substrates are thermoplastic. Substrates can optionally be calendar bonded, point bonded, ultrasonically bonded, infrared bonded, through air bonded, needle punched, hydroentangled, melt bonded, adhesive bonded, cold press, or any other known technical approach for bonding layers of material.

The water soluble products 5 can be separated from one another by a die cutter 160, optionally a rotary die cutter 160. A rotary die cutter 160 comprises a die roll and an anvil roll, the die roll and anvil rotating counter to one another.

The substrates can be bonded to one another and die cut in a single step using a reciprocating bonding and die cutting apparatus or a single rotary bonding and die cutting apparatus. In a rotary bonding and die cutting apparatus that combines the bonding and die cutting, the die is shaped to provide a die cut in which the material being cut is pinched between the knife-edge of the die and the smooth surface of the anvil. Further the die is shaped to compress portions of the product, or continuous substrates, and layers thereof together to bond them to one another. The die can be a patterned die that provides a cutting and bonding pattern to the plies, continuous ply substrates, and layers thereof. Optionally, the die can be heated, which might be practical for thermal bonding.

To be economically feasible, the manufacturing process can have a target minimum number of fibrous water soluble products per second. This may be, for example, about 6 water soluble product doses per second. The manufacturing process may have a target of about 100 to about 1000 doses per minute per lane.

Fibrous Water Soluble Product

Figure 2:
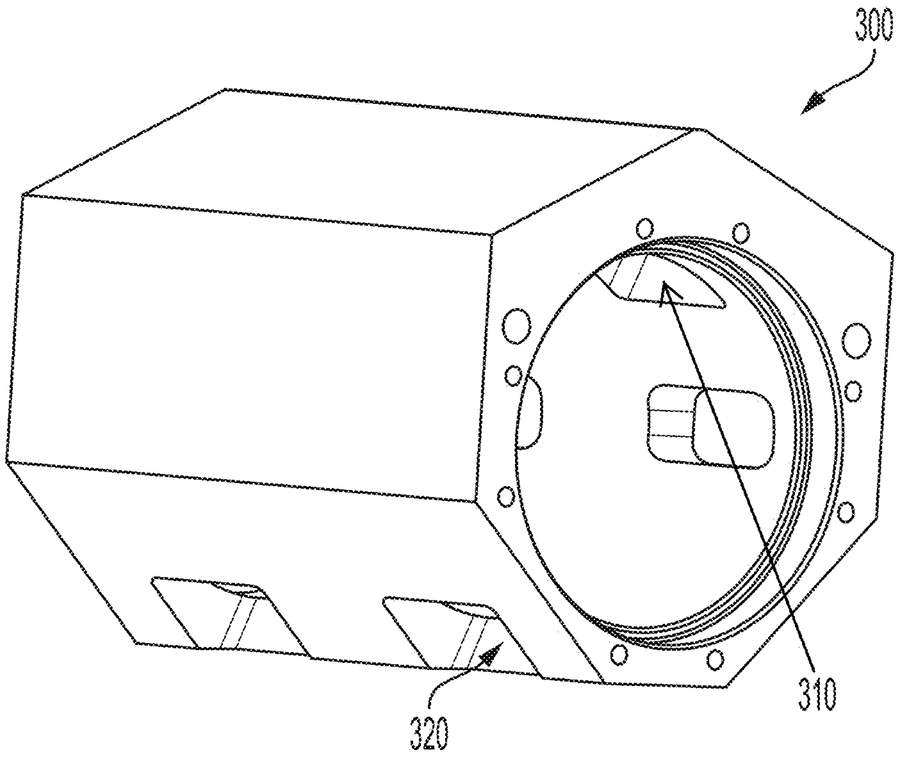
FIG. 2 is a representation of a stator.

A substrate, as discussed above, may be a fibrous water soluble substrate. The fibrous water soluble substrate may be continuous or discrete as shown in FIGS. 1 and 2. The fibrous water soluble substrate can be utilized in the formation of a fibrous water soluble product which is discussed in more detail below.

A fibrous water soluble product can include one or more layers. These layers may be superposed upon one another. The layers may lay directly upon one another, have particles in between the layers, or combination thereof. For example, as can be seen in FIG. 5, one substrate layer 500 is on the bottom, with particles 510 on top of it, with a second substrate layer 520 over the particles 510, a second set of particles 530 on top of the second layer 520, and a third substrate layer 540 superposed over the second set of particles 530 and the second layer 520 to form a fibrous water soluble product. The edges of the layers look pinched in FIG. 5, as they have been pressed together and sealed to hold the particles inside.

The fibrous water-soluble unit dose article may comprise of 50% or greater of bio-based materials, such as for example between 50% and 95% bio-based. Some of the individual components of the fibrous water-soluble unit dose article may be fully bio-based to create an article that has a total bio-based content of greater than 50%.

These fibrous water-soluble unit dose articles can be dissolved under various wash conditions, e.g., low temperature, low water and/or short wash cycles or cycles where consumers have been overloading the machine, especially with items having high water absorption capacities, while providing sufficient delivery of active agents for the intended effect on the target consumer substrates (with similar performance as today's liquid products).

The surface of the fibrous water-soluble unit dose article may comprise a printed area. The printed area may cover between about 10% and about 100% of the surface of the article. The area of print may comprise inks, pigments, dyes, bluing agents or mixtures thereof. The area of print may be opaque, translucent or transparent. The area of print may comprise a single color or multiple colors. The printed area maybe on more than one side of the article and contain instructional text, graphics, etc. The surface of the water-soluble unit dose article may comprise an aversive agent, for example a bittering agent. Suitable bittering agents include, but are not limited to, naringin, sucrose octacetate, quinine hydrochloride, denatonium benzoate, or mixtures thereof. Any suitable level of aversive agent may be used. Suitable levels include, but are not limited to, 1 to 5000 ppm, or even 100 to 2500 ppm, or even 250 to 2000 ppm.

The fibrous water-soluble unit dose articles may exhibit a thickness, for example, of greater than 0.01 mm and/or greater than 0.05 mm and/or greater than 0.1 mm and/or to about 100 mm and/or to about 50 mm and/or to about 20 mm and/or to about 10 mm and/or to about 5 mm and/or to about 2 mm and/or to about 0.5 mm and/or to about 0.3 mm.

The fibrous water-soluble unit dose articles may have basis weights of from about 500 grams/$m^2$ to about 5,000 grams/$m^2$, or from about 1,000 grams/$m^2$ to about 4,000 grams/$m^2$, or from about 1,500 grams/$m^2$ to about 3,500 grams/$m^2$, or from about 2,000 grams/$m^2$ to about 3,000 grams/$m^2$, or any combination thereof.

The fibrous water-soluble unit dose article may exhibit different regions, such as different regions of basis weight, density, caliper, and/or wetting characteristics. The fibrous water-soluble unit dose article may be compressed at the point of edge sealing. The fibrous water-soluble unit dose article may comprise texture on one or more of its surfaces. A surface of the fibrous water-soluble unit dose article may comprise a pattern, such as a non-random, repeating pattern. The fibrous water-soluble unit dose article may comprise apertures. The fibrous water-soluble unit dose article may comprise a fibrous structure having discrete regions of fibrous elements that differ from other regions of fibrous elements in the structure. The fibrous water-soluble unit dose article may be used as is or it may be coated with one or more active agents.

The fibrous water-soluble unit dose article may comprise one or more plies. The fibrous water-soluble unit dose article may comprise at least two and/or at least three and/or at least four and/or at least five plies. The fibrous plies can be fibrous structures. Each ply may comprise one or more layers, for example one or more fibrous element layers, one or more particle layers, and/or one or more fibrous element/particle mixture layers. The layer(s) may be sealed. In particular, particle layers and fibrous element/particle mixture layers may be sealed, such that the particles do not leak out. The water-soluble unit dose articles may comprise multiple plies, where each ply comprises two layers, where one layer is a fibrous element layer and one layer is a fibrous element/particle mixture layer, and where the multiple plies are sealed (e.g., at the edges) together. Scaling may inhibit the leakage of particles as well as help the unit dose article maintain its original structure. However, upon addition of the water-soluble unit dose article to water, the unit dose article dissolves and releases the particles into the wash liquor.

The fibrous water-soluble unit dose may be in the form of any three-dimensional structure. The fibrous water-soluble unit dose article can be perforated. The article can also be cut or shaped into various sizes for different intended uses. For example, the water-soluble unit dose may be in the form of a square, a rounded square, a kite, a rectangle, a triangle, a circle, an ellipse, and mixtures thereof.

The fibrous water-soluble unit dose may comprise less than 10 ingredients. The water-soluble unit dose may comprise between 3 and 9 ingredients, such as, for example, 4 ingredients, 5 ingredients, 6 ingredients, 7 ingredients, or 8 ingredients.

The fibrous water-soluble unit dose articles disclosed herein comprise a water-soluble fibrous structure and one or more particles. The fibrous water-soluble fibrous structure may comprise a plurality of fibrous elements, for example a plurality of filaments. The one or more particles, for example one or more active agent-containing particles, may be distributed throughout the structure. The fibrous water-soluble unit dose article may comprise a plurality of two or more and/or three or more fibrous elements that are inter-entangled or otherwise associated with one another to form a fibrous structure and one or more particles, which may be distributed throughout the fibrous structure.

The fibrous water-soluble unit dose article may comprise a water-soluble fibrous structure. The water-soluble fibrous structure may comprise two or more different fibrous elements. Non-limiting examples of differences in the fibrous elements may be physical differences, such as differences in diameter, length, texture, shape, rigidness, elasticity, and the like; chemical differences, such as crosslinking level, solubility, melting point, Tg, active agent, filament-forming material, color, level of active agent, basis weight, level of filament-forming material, presence of any coating on fibrous element, biodegradable or not, hydrophobic or not, contact angle, and the like; differences in whether the fibrous element loses its physical structure when the fibrous element is exposed to conditions of intended use; differences in whether the fibrous element's morphology changes when the fibrous element is exposed to conditions of intended use; and differences in rate at which the fibrous element releases one or more of its active agents when the fibrous element is exposed to conditions of intended use. Two or more fibrous elements within the fibrous structure may comprise different active agents. This may be the case where the different active agents may be incompatible with one another, for example an anionic surfactant and a cationic polymer. When using different fibrous elements, the resulting structure may exhibit different wetting, imbibition, and solubility characteristics.

Fibrous Structure

Fibrous structures comprise one or more fibrous elements. The fibrous elements can be associated with one another to form a structure. Fibrous structures can include particles within and or on the structure. Fibrous structures can be homogeneous, layered, unitary, zoned, or as otherwise desired, with different active agents defining the various aforesaid portions.

A fibrous structure can comprise one or more layers, the layers together forming a ply.

Fibrous Elements

The fibrous elements may be water-soluble. The fibrous elements may comprise one or more filament-forming materials and/or one or more active agents, such as a surfactant. The one or more active agents may be releasable from the fibrous element, such as when the fibrous element and/or fibrous structure comprising the fibrous element is exposed to conditions of intended use.

The fibrous elements may be spun from a filament-forming composition, also referred to as fibrous element-forming compositions, via suitable spinning process operations, such as meltblowing, spunbonding, electro-spinning, and/or rotary spinning.

"Filament-forming composition" and/or "fibrous element-forming composition" as used herein means a composition that is suitable for making a fibrous element such as by meltblowing and/or spunbonding. The filament-forming composition comprises one or more filament-forming materials that exhibit properties that make them suitable for spinning into a fibrous element. The filament-forming material may comprise a polymer. In addition to one or more filament-forming materials, the filament-forming composition may comprise one or more active agents, for example, a surfactant. In addition, the filament-forming composition may comprise one or more polar solvents, such as water, into which one or more, for example all, of the filament-forming materials and/or one or more, for example all, of the active agents are dissolved and/or dispersed prior to spinning a fibrous element, such as a filament from the filament-forming composition.

The filament-forming composition may comprise two or more different filament-forming materials. Thus, the fibrous elements may be monocomponent (one type of filament-forming material) and/or multicomponent, such as bicomponent. The two or more different filament-forming materials may be randomly combined to form a fibrous element. The two or more different filament-forming materials may be orderly combined to form a fibrous element, such as a core and sheath bicomponent fibrous element, which is not considered a random mixture of different filament-forming materials for purposes of the present disclosure. Bicomponent fibrous elements may be in any form, such as side-by-side, core and sheath, islands-in-the-sea and the like.

The fibrous elements may be substantially free of alkylalkoxylated sulfate. Each fibrous element may comprise from about 0%, or from about 0.1%, or from about 5%, or from about 10%, or from about 15%, or from about 20%, or from about 25%, or from about 30%, or from about 35%, or from about 40% to about 0.2%, or to about 1%, or to about 5%, or to about 10%, or to about 15%, or to about 20%, or to about 25%, or to about 30%, or to about 35% or to about 40%, or to about 50% by weight on a dry fibrous element basis of an alkylalkoxylated sulfate. The amount of alkylalkoxylated sulfate in each of the fibrous elements is sufficiently small so as not to affect the processing stability and film dissolution thereof. Alkylalkoxylated sulfates, when dissolved in water, may undergo a highly viscous hexagonal phase at certain concentration ranges, e.g., 30-60% by weight, resulting in a gel-like substance. Therefore, if incorporated into the fibrous elements in a significant amount, alkylalkoxylated sulfates may significantly slow down the dissolution of the water-soluble unit dose articles in water, and worse yet, result in undissolved solids afterwards. Correspondingly, most of such surfactants are formulated into the particles.

The fibrous elements may each contain at least one filament-forming material and an active agent, preferably a surfactant. The surfactant may have a relatively low hydrophilicity, as such a surfactant is less likely to form a viscous, gel-like hexagonal phase when being diluted. By using such a surfactant in forming the filaments, gel-formation during wash may be effectively reduced, which in turn may result in faster dissolution and low or no residues in the wash. The surfactant can be selected, for example, from the group consisting of unalkoxylated $C_6$-$C_{20}$ linear or branched alkyl sulfates (AS), $C_6$-$C_{20}$ linear alkylbenzene sulfonates (LAS), and combinations thereof. The surfactant may be a $C_6$-$C_{20}$ linear alkylbenzene sulfonates (LAS). LAS surfactants are well known in the art and can be readily obtained by sulfonating commercially available linear alkylbenzenes. Exemplary $C_6$-$C_{20}$ linear alkylbenzene sulfonates that can be used include alkali metal, alkaline earth metal or ammonium salts of $C_6$-$C_{20}$ linear alkylbenzene sulfonic acids, such as the sodium, potassium, magnesium and/or ammonium salts of $C_{11}$-$C_{18}$ or $C_{11}$-$C_{14}$ linear alkylbenzene sulfonic acids. The sodium or potassium salts of $C_{12}$ linear alkylbenzene sulfonic acids, for example, the sodium salt of $C_{12}$ linear alkylbenzene sulfonic acid, i.e., sodium dodecylbenzene sulfonate, may be used as the first surfactant.

The fibrous element may comprise at least about 5%, and/or at least about 10%, and/or at least about 15%, and/or at least about 20%, and/or less than about 80%, and/or less than about 75%, and/or less than about 65%, and/or less than about 60%, and/or less than about 55%, and/or less than about 50%, and/or less than about 45%, and/or less than about 40%, and/or less than about 35%, and/or less than about 30%, and/or less than about 25% by weight on a dry fibrous element basis and/or dry fibrous structure basis of the filament-forming material and greater than about 20%, and/or at least about 35%, and/or at least about 40%, and/or at least about 45%, and/or at least about 50%, and/or at least about 55%, and/or at least about 60%, and/or at least about 65%, and/or at least about 70%, and/or less than about 95%, and/or less than about 90%, and/or less than about 85%, and/or less than about 80%, and/or less than about 75% by weight on a dry fibrous element basis and/or dry fibrous structure basis of an active agent, preferably surfactant. The fibrous element may comprise greater than about 80% by weight on a dry fibrous element basis and/or dry fibrous structure basis of surfactant.

Preferably, each fibrous element may be characterized by a sufficiently high total surfactant content, e.g., at least about 30%, or at least about 40%, or at least about 50%, or at least about 60%, or at least about 70%, by weight on a dry fibrous element basis and/or dry fibrous structure basis of the first surfactant.

The total level of filament-forming materials present in the fibrous element may be from about 5% to less than about 80% by weight on a dry fibrous element basis and/or dry fibrous structure basis and the total level of surfactant present in the fibrous element may be greater than about 20% to about 95% by weight on a dry fibrous element basis and/or dry fibrous structure basis.

One or more of the fibrous elements may comprise at least one additional surfactant selected from the group consisting of other anionic surfactants (i.e., other than AS and LAS), nonionic surfactants, zwitterionic surfactants, amphoteric surfactants, cationic surfactants, and combinations thereof.

Other suitable anionic surfactants include $C_6$-$C_{20}$ linear or branched alkyl sulfonates, $C_6$-$C_{20}$ linear or branched alkyl carboxylates, $C_6$-$C_{20}$ linear or branched alkyl phosphates, $C_6$-$C_{20}$ linear or branched alkyl phosphonates, $C_6$-$C_{20}$ alkyl N-methyl glucose amides, $C_6$-$C_{20}$ methyl ester sulfonates (MES), and combinations thereof.

Suitable nonionic surfactants include alkoxylated fatty alcohols. The nonionic surfactant may be selected from ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. Non-limiting examples of nonionic surfactants useful herein include: $C_8$-$C_{18}$ alkylethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA; $C_{14}$-$C_{22}$ mid-chain branched alkylalkoxylates, $BAE_x$, wherein x is from 1 to 30; alkylpolysaccharides; specifically alkylpolyglycosides; polyhydroxy fatty acid amides; and ether capped poly(oxyalkylated) alcohol surfactants. Suitable nonionic detersive surfactants also include alkyl polyglucoside and alkylalkoxylated alcohol. Suitable nonionic surfactants also include those sold under the tradename Lutensol® from BASF.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, e.g., amido propyldimethyl amine (APA). Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

$$(R)(R_1)(R_2)(R_3)N^+X^-$$

wherein, R is a linear or branched, substituted or unsubstituted $C_6$-$C_{18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulfate; and sulfonate. Suitable cationic detersive surfactants are mono-$C_6$-$C_{18}$ alkyl mono-hydroxyethyl di-methyl quaternary ammonium chlorides. Highly suitable cationic detersive surfactants are mono-$C_8$-$C_{10}$ alkyl mono-hydroxyethyl di-methyl quaternary ammonium chloride, mono-$C_{10}$-$C_{12}$ alkyl mono-hydroxyethyl di-methyl quaternary ammonium chloride and mono-$C_{19}$ alkyl mono-hydroxyethyl di-methyl quaternary ammonium chloride.

Suitable examples of zwitterionic surfactants include: derivatives of secondary and tertiary amines, including derivatives of heterocyclic secondary and tertiary amines; derivatives of quaternary ammonium, quaternary phosphonium or tertiary sulfonium compounds; betaines, including alkyl dimethyl betaine, cocodimethyl amidopropyl betaine, and sulfo and hydroxy betaines; $C_8$ to $C_{18}$ (e.g., from $C_{12}$ to $C_{18}$) amine oxides; N-alkyl-N,N-dimethylammino-1-propane sulfonate, where the alkyl group can be $C_8$ to $C_{18}$.

Suitable amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Suitable amphoteric surfactants also include sarcosinates, glycinates, taurinates, and mixtures thereof.

The fibrous elements may comprise a surfactant system containing only anionic surfactants, e.g., either a single anionic surfactant or a combination of two or more different anionic surfactants. Alternatively, the fibrous elements may include a composite surfactant system, e.g., containing a combination of one or more anionic surfactants with one or more nonionic surfactants, or a combination of one or more anionic surfactants with one or more zwitterionic surfactants, or a combination of one or more anionic surfactants with one or more amphoteric surfactants, or a combination of one or more anionic surfactants with one or more cationic surfactants, or a combination of all the above-mentioned types of surfactants (i.e., anionic, nonionic, amphoteric and cationic).

In general, fibrous elements are elongated particulates having a length greatly exceeding average diameter, e.g., a length to average diameter ratio of at least about 10. A fibrous element may be a filament or a fiber. Filaments are relatively longer than fibers. A filament may have a length of greater than or equal to about 5.08 cm (2 in.), and/or greater than or equal to about 7.62 cm (3 in.), and/or greater than or equal to about 10.16 cm (4 in.), and/or greater than or equal to about 15.24 cm (6 in.). A fiber may have a length of less than about 5.08 cm (2 in.), and/or less than about 3.81 cm (1.5 in.), and/or less than about 2.54 cm (1 in.).

The one or more filament-forming materials and active agents may be present in the fibrous element at a weight ratio of total level of filament-forming materials to active agents of about 2.0 or less, and/or about 1.85 or less, and/or less than about 1.7, and/or less than about 1.6, and/or less than about 1.5, and/or less than about 1.3, and/or less than about 1.2, and/or less than about 1, and/or less than about 0.7, and/or less than about 0.5, and/or less than about 0.4, and/or less than about 0.3, and/or greater than about 0.1, and/or greater than about 0.15, and/or greater than about 0.2. The one or more filament-forming materials and active agents may be present in the fibrous element at a weight ratio of total level of filament-forming materials to active agents of about 0.2 to about 0.7.

The fibrous element may comprise from about 10% to less than about 80% by weight on a dry fibrous element basis and/or dry fibrous structure basis of a filament-forming material, such as polyvinyl alcohol polymer, starch polymer, and/or carboxymethylcellulose polymer, and greater than about 20% to about 90% by weight on a dry fibrous element basis and/or dry fibrous structure basis of an active agent, such as surfactant. The fibrous element may further comprise a plasticizer, such as glycerin, and/or additional pH adjusting agents, such as citric acid. The fibrous element may have a weight ratio of filament-forming material to active agent of about 2.0 or less. The filament-forming material may be selected from the group consisting of polyvinyl alcohol, starch, carboxymethylcellulose, polyethylene oxide, and other suitable polymers, especially hydroxyl-containing polymers and their derivatives. The filament-forming material may range in weight average molecular weight from about 100,000 g/mol to about 3,000,000 g/mol. It is believed that in this range, the filament-forming material may provide extensional rheology, without being so elastic that fiber attenuation is inhibited in the fiber-making process.

The one or more active agents may be releasable and/or released when the fibrous element and/or fibrous structure comprising the fibrous element is exposed to conditions of intended use. The one or more active agents in the fibrous element may be selected from the group consisting of surfactants, organic polymeric compounds, and mixtures thereof.

The fibrous elements may exhibit a diameter of less than about 300 μm, and/or less than about 75 μm, and/or less than about 50 μm, and/or less than about 25 μm, and/or less than about 10 μm, and/or less than about 5 μm, and/or less than about 1 μm. The fibrous elements may exhibit a diameter of greater than about 1 μm. The diameter of a fibrous element may be used to control the rate of release of one or more active agents present in the fibrous element and/or the rate of loss and/or altering of the fibrous element's physical structure.

Particles

Particles may be incorporated into a fibrous water soluble product as discussed above, at a level of about 0.1 g to about 30 g, for example. The type of particles utilized can be any that are compatible with the manufacturing system. One parameter which can contribute to the success of depositing particles according to this method is the flowability of the particles. The flowability ($f_p$) of particles can be defined as the ratio of consolidation stress (cs) to unconfined yield strength (ys). The larger the $f_p$, the better particles flow. Generally, it is believed that an $f_p<1$ is not flowing, an $f_p>1$ but less than 2 is very cohesive, an $f_p$ of 2 to less than 4 is considered cohesive, an $f_p$ of 4 to less than 10 is considered easy flowing, and an $f_p$ of 10 or more is considered free flowing. For the process described above, particles with an $f_p$ value of about 4 or more are preferred. The level of flowability can be determined by the Flowability Method listed below. Flowability of the particles may be for example, about 1 or more, about 2 or more, about 3 or more, about 4 or more, about 5 or more, about 5 or more, about 6 or more, about 7 or more, about 8 or more, about 9 or more, about 10 or more, to about 1000 or less.

The particles may be a powder, granule, agglomerate, encapsulate, microcapsule, and/or prill. The particles may be made using a number of well-known methods in the art, such as spray-drying, agglomeration, extrusion, prilling, encapsulation, pastillation, and combinations thereof. The shape of the particles can be in the form of spheres, rods, plates, tubes, squares, rectangles, discs, stars, fibers or have regular or irregular random forms. The particles may have a D50 particle size of from about 100 μm to about 1600 μm.

The particles may include a mixture of chemically different particles, such as: surfactant particles, including surfactant agglomerates, surfactant extrudates, surfactant needles, surfactant noodles, surfactant flakes; phosphate particles; zeolite particles; silicate salt particles, especially sodium silicate particles; carbonate salt particles, especially sodium carbonate particles; polymer particles such as carboxylate polymer particles, cellulosic polymer particles, starch particles, polyester particles, polyamine particles, terephthalate polymer particles, polyethylene glycol particles; aesthetic particles such as colored noodles, needles, lamellae particles and ring particles; enzyme particles such as protease granulates, amylase granulates, lipase granulates, cellulase granulates, mannanase granulates, pectate lyase granulates, xyloglucanase granulates, bleaching enzyme granulates and co-granulates of any of these enzymes, these enzyme granulates may comprise sodium sulphate; bleach particles, such as percarbonate particles, especially coated percarbonate particles, such as percarbonate coated with carbonate salt, sulphate salt, silicate salt, borosilicate salt, or any combination thereof, perborate particles, bleach activator particles such as tetra acetyl ethylene diamine particles and/or alkyl oxybenzene sulphonate particles, bleach catalyst particles such as transition metal catalyst particles, and/or isoquinolinium bleach catalyst particles, pre-formed peracid particles, especially coated pre-formed peracid particles; filler particles such as sulphate salt particles and chloride particles; clay particles such as montmorillonite particles and particles of clay and silicone; flocculant particles such as polyethylene oxide particles; wax particles such as wax agglomerates; silicone particles, brightener particles; dye transfer inhibition particles; dye fixative particles; perfume particles such as perfume microcapsules and starch encapsulated perfume accord particles, or pro-perfume particles such as Schiff base reaction product particles; hueing dye particles; chelant particles such as chelant agglomerates; and any combination thereof.

Combinations

1. A method of manufacturing a fibrous water soluble product comprising particles, comprising: a) providing a first continuous water soluble fibrous substrate comprising a first side and moving in a first direction, b) providing a discretizing unit comprising one or more pockets comprising an opening; c) providing a continuous feed of first particles to at least one of the one or more pockets of the discretizing unit through the pocket opening at least partially filling the at least one of the one or more pockets, d) delivering the first particles from the pocket through the opening onto a portion of the first side of the first continuous water soluble fibrous substrate, and e) at least partially covering the first side of the first continuous water soluble fibrous substrate.

2. A method of manufacturing a fibrous water soluble product comprising particles, comprising: a) providing a first continuous water soluble fibrous substrate comprising a first side and moving in a first direction, b) providing a discretizing unit comprising one or more pockets comprising an opening; c) providing a continuous feed of first particles to at least one of the one or more pockets of the discretizing unit through the pocket opening, d) intermittently delivering the first particles from the pocket opening onto a portion of a first side of the first continuous water soluble fibrous substrate, e) metering the first particles to a target dose, and f) at least partially covering the first side of the first continuous water soluble fibrous substrate.

3. The method of any one of 1 or 2, further comprising sealing the first continuous water soluble fibrous substrate and the covering entrapping at least a portion of the first particles between the first water soluble substrate and the covering, wherein the covering comprises a second fibrous water soluble substrate.

4. The method of 3, wherein sealing the first continuous water soluble fibrous substrate to the second continuous water soluble fibrous substrate entrapping at least a portion of the particles forms a unit dose.

5. The method of any of 1-4, wherein the first particles are delivered to a target area on the first side of the first continuous water soluble substrate and at least 75%, about 80% or more, about 85% or more, about 90% or more, about 95% or more, or most preferably about 97% or more, of the first particles stay on the target area upon exiting the discretizing unit.

6. The method of any of 1-5, wherein the discretizing unit comprises a rotor.

7. The method of 6, wherein the rotor comprises the one or more pockets and the particles are contained in at least one of the one or more pockets of the rotor prior to being delivered onto a portion of the first side of the first continuous substrate.

8. The method of any one of 1-7, wherein a size of the pocket meters the amount of the first particles to be delivered to the portion of the first side of the first continuous substrate.

9. The method of any one of 1-8, wherein the first continuous water soluble fibrous substrate is moving in the first direction at about a speed of about 5 m/min to about 100 m/min.

10. The method of any one of 1-9, wherein the first particles are delivered intermittently from the one or more pockets of the discretizing unit.

11. The method of any one of 1-10, wherein the particles have a flowability of about 4 or more, preferably from about 4 to about 1000.

12. The method of any one of 1-11, wherein the particles are delivered from the discretizing unit into an area of about 20 $mm^2$ to about 6000 $mm^2$ of the first continuous substrate to form a unit dose, wherein one or more unit doses may be formed on the first continuous substrate.

13. The method of any one of 1-12, wherein the discretizing unit discretizes the continuous flow of the first particles into one or more individual doses.

14. The method of any one of 1-13, further comprising: a) providing a third continuous water soluble fibrous substrate moving having a first side and a second side in the first direction, b) providing a feed of second particles to a second discretizing unit, c) delivering the second particles from the discretizing unit onto a portion of the second side of the second continuous water soluble substrate; d) placing the first side of the third continuous substrate over the second particles.

15. The method of any one of 1-14, further comprising providing a feed of second particles to the discretizing unit, wherein the first particles and the second particles are the same or different.

16. The method of any one of 1-15, wherein the discretizing unit moves at a constant speed.

17. The method of any one of 1-16, wherein the discretizing unit moves at a variable speed.

18. The method of any one of 1-17, wherein at least one pocket of the discretizing unit travels in sync with the first continuous water soluble fibrous substrate during deposition of the particles onto the first continuous water soluble fibrous substrate.

19. The method of any one of 1-18, wherein the particles comprise powder, granule, agglomerate, encapsulate, microcapsule, prill, or a combination thereof.

20. The method of any one of 1-19, wherein the first particles have a flowability of about 4 or more.

21. A particle applicator apparatus, comprising:

a stator comprising an inlet and an outlet; and a rotating discretizing unit for receiving and delivering particles comprising one or more pockets, dimples, or a combination thereof;

wherein the stator and rotating discretizing unit are operably connected.

22. The particle applicator apparatus of 21, wherein the rotating discretizing unit rotates at a variable speed.

23. The particle applicator apparatus of any one of 21-22, wherein the rotating discretizing unit comprises pockets, preferably pockets which are equidistantly spaced.

24. The particle applicator apparatus of any one of 21-23, wherein the rotating discretizing unit comprises from about 1 to about 20 pockets, from about 2 to about 20 pockets, from about 3 to about 20 pockets, from about 5 to about 18 pockets, from about 6 to about 16 pockets, from about 8 to about 16 pockets, or from about 8 to about 12 pockets.

25. The particle applicator apparatus of any one of 21-24, wherein the rotating discretizing unit comprises pockets having a cross direction dimension of from about 1 mm to about 100 mm, from about 3 mm to about 95 mm, from about 10 mm to about 90 mm, from about 20 to about 50 mm, or from about 25 mm to about 40 mm.

26. The particle applicator apparatus of any one of 21-25, wherein the rotating discretizing unit comprises pockets having a machine direction dimension of from about 1 mm to about 100 mm, from about 3 mm to about 95 mm, from about 10 mm to about 90 mm, from about 20 to about 50 mm, from about 25 mm to about 40, from about 10 mm to about 15 mm, or from about 8 mm to about 12 mm.

27. The particle applicator apparatus of any one of 21-26, wherein the rotating discretizing unit comprises pockets having a depth of from about 1 mm to about 100 mm, from about 3 mm to about 95 mm, from about 10 mm to about 90 mm, from about 20 to about 50 mm, from about 25 mm to about 40, from about 10 mm to about 15 mm, or from about 8 mm to about 12 mm.

28. The particle applicator apparatus of any one of 21-27, wherein the rotating discretizing unit comprises pockets having a shape of a rectangular prism, cube, cone, pyramid, a concave "v", divots, cylindrical, any shape with a triangular cross section, any shape with a rectangular cross section, or any combination thereof.

29. The particle applicator apparatus of any one of 21-28, wherein the discretizing unit meters a target dose of particles.

30. The particle applicator apparatus of any one of 21-29, wherein the rotating discretizing unit comprises pockets and the pockets are the volume of a target dose of particles.

31. The particle applicator apparatus of any one of 21-30, wherein a target dose of particles for the rotating discretizing unit is from about 0.1 g to about 15 g; from about 0.2 g to about 15 g, from about 0.3 g to about 10 g, from about 0.4 g to about 8 g, from about 0.1 g to about 4.0 g. A target dose in terms of volume could be, for example, from about 0.1 $cm^3$ to about 8 $cm^3$, from about 0.1 $cm^3$ to about 7 $cm^3$, from about 0.1 $cm^3$ to about 6 $cm^3$, from about 0.1 $cm^3$ to about 5 $cm^3$, and from about 0.1 $cm^3$ to about 4.0 $cm^3$, or any combination thereof.

32. The particle applicator apparatus of any one of 21-31, wherein the rotating discretizing unit comprises a rotor.

33. The particle applicator apparatus of any one of 21-32, wherein the stator comprising a housing.

34. The particle applicator apparatus of 33, wherein the rotating discretizing unit is located at least partially inside of the stator housing.

35. The particle applicator apparatus of 34, wherein there is an annular space between the stator housing and the rotating discretizing unit.

36. The particle applicator apparatus of 35, wherein the annular space is from about 10 μm to about 125 μm, from about 20 μm to about 100 μm, from about 20 μm to about 90 μm, from about 30 μm to about 80 μm, from about 40 μm to about 80 μm, from about 50 μm to about 75 μm, or any combination thereof.

37. The particle applicator of any 21-36, wherein the stator inlet is positioned so that the rotating discretizing unit receives particles when the portion of the rotating discretizing unit receiving particles is heading in a downward trajectory.

38. The particle applicator of any of 21-37, wherein the stator outlet is located about 45° from horizontal.

39. The particle applicator of any of 21-38, wherein the particle applicator applies particles to a fibrous substrate.

Flowability Method

The following comparative test is carried out to demonstrate the flowability of particles at ambient temperature and humidity The device adapted for this test is a commercially available flowability testing system, FloDex™ (Teledyne Hanson Research, Chatsworth, Calif., USA), which contains a flat bottom cylindrical hopper with a removable bottom and a set of interchangeable bottom disks containing therein orifices of different sizes. Further, additional bottom disks with orifices of smaller sizes (with diameters below 4 mm) are made so as to provide a more complete range of orifice diameters including 3 mm, 3 mm, 4 mm, 5 mm, 6 mm, 7 mm, 8 mm, 9 mm, 10 mm, 12 mm, 14 mm, 16 mm, 18 mm until 34 mm.

The FloDex™ equipment includes a funnel for loading a particulate test sample into a stainless-steel flat-bottom cylindrical hopper having a diameter of about 5.7 cm. The hopper has a removable bottom defined by a removal bottom disk with an orifice of a specific size therein. Multiple removal bottom disks having orifices of different sizes are provided, as mentioned hereinabove, which can be interchangeably fit at the bottom of hopper in place of disk to thereby define a bottom orifice of a different size. A discharge gate is placed immediately underneath the orifice and above a receiver. When the flowability measurement starts, the discharge gate is moved so as to expose the bottom orifice and allow the particulate test sample to flow from the hopper through the bottom orifice down to the receiver.

To test the flowability of a specific test sample, the following steps are followed:

a. Fill the hopper by pouring about 75 ml of the test sample through funnel. This corresponds to a roughly 1" (25 mm) layer of powder in the cylindrical hopper.
b. After the sample settles for 30 seconds, open the spring-loaded discharge gate and allow the sample to flow through the orifice into the receiver.
c. Steps (a) and (b) are repeated for the same test sample using different bottom disks having orifices of gradually increasing orifice sizes. At the beginning when the bottom disks with relatively smaller orifices are used, the flow of the test sample typically stops at some point due to jamming, i.e., it cannot pass through the orifice due to the small orifice size. Once the flow of test sample stops, a jam is declared, and the specific bottom disk causing the jam is removed and replaced by another bottom disk with an orifice that is slightly larger for another repeat of steps (a) and (b). When the test sample is able to flow completely through an orifice of a specific size for three (3) consecutive times without jamming, such orifice size is recorded as the FloDex™ Blockage Parameter and B refers to the diameter of the orifice in the Flow Disk used in the test. The smaller the FloDex™ Blockage Parameter, the better the flowability of the test sample (i.e., it can flow through smaller orifices without jamming).

Flowability is then calculated according to the following equation:

$$ffc = \frac{H(\theta') \cdot A \cdot \left(1 - e^{-\frac{K \cdot tan(\phi') \cdot U]h}{A}}\right)}{B \cdot K \cdot \tan(\phi') \cdot U}$$

where H(θ')=(130°−θ')/65° is the hopper flow function as proposed by Jenike, θ is the internal flow-channel angle in the powder, A is the cross-sectional area of the FloDex™, U is the perimeter of the FloDex™, K is the lateral stress ratio proposed by Janssen, Φ' is the wall friction coefficient between the powder and the side wall of the steel cylinder, B is the critical diameter of blockage in the FloDex™ (in units mm), and h is the fill height of powder in the FloDex™ (in units mm). After inserting the values for FloDex™ geometry and reasonable values for powder in a flat-bottom steel hopper (K=0.4, θ'=10°, Φ'=20°), the equation simplifies to:

$$ffc = \frac{210.8 \cdot \left(1 - e^{-0.0102h}\right)}{B}$$

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manufacturing a fibrous water soluble product comprising particles, comprising:

a) providing a first continuous water soluble fibrous substrate comprising a first side and moving in a first direction;
b) providing a discretizing unit comprising one or more pockets comprising an opening and a rotor;
c) providing a stator;
d) providing a continuous feed of first particles through a plane of the stator to at least one of the one or more pockets of the discretizing unit through the pocket opening at least partially filling the at least one of the one or more pockets;
e) delivering the first particles from the pocket through the pocket opening and through an opening in the stator onto a portion of the first side of the first continuous water soluble fibrous substrate, by gravity, without the discretizing unit contacting the continuous water soluble fibrous substrate, such that the final portion of the particles exiting the stator outlet have a trajectory that is not predominantly downward, but is in the machine direction of the first continuous water soluble fibrous substrate; and
f) at least partially covering the first side of the first continuous water soluble fibrous substrate with a second continuous water soluble fibrous substrate;
g) cutting the first continuous water soluble fibrous substrate and the second continuous water soluble fibrous substrate using a die.

2. The method of claim 1, further comprising sealing the first continuous water soluble fibrous substrate and the covering entrapping at least a portion of the first particles between the first water soluble substrate and the covering.

3. The method of claim 2, wherein sealing the first continuous water soluble fibrous substrate to the second continuous water soluble fibrous substrate entrapping at least a portion of the particles forms a unit dose.

4. The method of claim 1, wherein the first particles are delivered to a target area on the first side of the first continuous water soluble substrate and at least 75% of the first particles stay on the target area upon exiting the discretizing unit.

5. The method of claim 1, wherein the discretizing unit comprises a rotor.

6. The method of claim 5, wherein the rotor comprises the one or more pockets and the particles are contained in at least one of the one or more pockets of the rotor prior to being delivered onto a portion of the first side of the first continuous substrate.

7. The method of claim 6, wherein a size of the pocket meters the amount of the first particles to be delivered to the portion of the first side of the first continuous substrate.

8. The method of claim 1, wherein the first continuous water soluble fibrous substrate is moving in the first direction at about a speed of about 5 m/min to about 100 m/min.

9. The method of claim 1, wherein the first particles are delivered intermittently from the one or more pockets of the discretizing unit.

10. The method of claim 1, wherein the particles have a flowability of about 4 or more.

11. The method of claim 1, wherein the particles are delivered from the discretizing unit into an area of about 20 $mm^2$ to about 6000 $mm^2$ of the first continuous substrate to form a unit dose, wherein one or more unit doses may be formed on the first continuous substrate.

12. The method of claim 1, wherein the discretizing unit discretizes the continuous flow of the first particles into one or more individual doses.

13. The method of claim 1, further comprising:

a) providing a third continuous water soluble fibrous substrate moving having a first side and a second side in the first direction, b) providing a feed of second particles to a second discretizing unit, c) delivering the second particles from the discretizing unit onto a portion of the second side of the second continuous water soluble fibrous substrate;

d) placing the first side of the third continuous substrate over the second particles.

14. The method of claim 1, further comprising providing a feed of second particles to the discretizing unit, wherein the first particles and the second particles are the same or different.

15. The method of claim 1, wherein the discretizing unit moves at a constant speed.

16. The method of claim 1 where the discretizing unit moves at a variable speed.

17. The method of claim 1, wherein at least one pocket of the discretizing unit travels in sync with the first continuous water soluble fibrous substrate during deposition of the particles onto the first continuous water soluble fibrous substrate.

18. The method of claim 1, wherein the particles comprise powder, granule, agglomerate, encapsulate, microcapsule, prill, or a combination thereof.

* * * * *